US010509454B2

(12) United States Patent
Montero et al.

(10) Patent No.: US 10,509,454 B2
(45) Date of Patent: Dec. 17, 2019

(54) POWER COMPANION STATUS

(71) Applicant: Dell Products L.P., Round Rock, TX (US)

(72) Inventors: Adolfo S. Montero, Pflugerville, TX (US); Richard Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 15/494,320

(22) Filed: Apr. 21, 2017

(65) Prior Publication Data

US 2018/0307290 A1    Oct. 25, 2018

(51) Int. Cl.
*G06F 1/28*      (2006.01)
*G06F 13/42*     (2006.01)
*G06F 13/38*     (2006.01)
*G06F 1/3212*    (2019.01)

(52) U.S. Cl.
CPC ............ *G06F 1/28* (2013.01); *G06F 1/3212* (2013.01); *G06F 13/385* (2013.01); *G06F 13/4282* (2013.01)

(58) Field of Classification Search
CPC .......... G06F 1/26; G06F 13/385; G06F 1/266; G06F 1/3212; G06F 3/147; G06F 11/324; G06F 13/4282; G06F 1/28
See application file for complete search history.

(56) References Cited

U.S. PATENT DOCUMENTS

| | | | | |
|---|---|---|---|---|
| 5,982,147 A | * | 11/1999 | Anderson | H02J 7/0004 320/132 |
| 2004/0008462 A1 | * | 1/2004 | Kluth | G06F 1/263 361/90 |
| 2012/0316695 A1 | * | 12/2012 | Chen | H02J 3/008 700/296 |
| 2014/0184637 A1 | * | 7/2014 | Chirde | G09G 5/30 345/620 |

(Continued)

OTHER PUBLICATIONS

"Universal Serial Bus Power Delivery Specification, Revision 3.0, Version 1.1", USB Implementers Forum, Inc., Jan. 12, 2017.

(Continued)

*Primary Examiner* — Terrell S Johnson
(74) *Attorney, Agent, or Firm* — Norton Rose Fulbright US LLP

(57) ABSTRACT

Battery status information may be provided to an information handling system, such as a laptop computer, through the same cable as the power. The transfer of battery status information may be facilitated by a power delivery (PD) controller in the external battery that communicates with a power delivery (PD) controller in the laptop computer. One cable type that can support the transfer of battery status information is a Universal Serial Bus (USB) Type-C cable. Battery status information may be transferred as packetized data according to a vendor-defined messaging (VDM) protocol from the external battery to the laptop computer. An embedded controller within the laptop computer may decode the packets and report the battery status information to components within the laptop computer. The battery status may be accessed through application programming interfaces (APIs) by third-party applications or displayed through the operating system.

20 Claims, 4 Drawing Sheets

(56) References Cited

U.S. PATENT DOCUMENTS

2015/0378409 A1* 12/2015 Dunstan ............... G06F 13/385
                                                          713/310

OTHER PUBLICATIONS

"Universal Serial Bus 3.1 Specification, Revision 1.0", USB Implementers Forum, Inc., Jul. 26, 2013.
"USB Power Delivery Specification" Adopters Agreement, USB 2.0 Promoter Group, Jul. 9, 2012.

* cited by examiner

POWER COMPANION STATUS

FIELD OF THE DISCLOSURE

The instant disclosure relates to power supplies for computing devices. More specifically, portions of this disclosure relate to monitoring a status of an external battery for computing devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems, such as laptop computers, may include portable power sources such as batteries. The batteries may be located inside the laptop computer and allow the computer to operate away from a power outlet. However, the capacity of an internal battery is limited by the size of the laptop computer. The desire for smaller and smaller laptop computers continues to reduce the capacity of the internal battery. External batteries may be used to provide an additional power source for a laptop computer to extend the duration of time that the laptop may be operated away from a power plug. One example external battery is illustrated in FIG. 1.

FIG. 1 is a perspective view of an external battery and operation elements therein according to the prior art. An external battery 100 includes a battery 108 coupled to a port 102. The port 102 may be a barrel plug for connecting by barrel cable 122 to a laptop computer's direct current (DC) power input port. A current charge level of the battery 108 may be indicated by pressing a gas gauge button 110, which causes one or more of the status lights 112, 114, 116, and 118 to activate for a short time. For example, if the battery is approximately half charged, pressing the button 110 will activate status lights 112 and 114 for about five seconds. After five seconds the lights deactivate. The operation of the button 110 and lights 112, 114, 116, and 118 may be controlled by a controller 120 coupled to the battery 108 in parallel with the port 102.

Conventional external batteries for laptops either do not communicate information to the laptop computer or communicate very limited information, such as a power supply ID, for identification purposes. A user of the laptop computer will not know when the battery is approaching total discharge until the battery has exhausted, which may cause the laptop computer to turn off abruptly. Although the user can push the gas gauge button to examine the battery charge, the battery may not be easily accessible or the user may forget to occasionally check the status.

SUMMARY

A better technique for checking the battery status is through the laptop computer. The user is more likely to check the battery status when the battery status is available through the laptop the computer. Furthermore, the laptop computer may monitor the battery status and autonomously perform actions based on the battery status without user intervention. Battery status information may be provided to the laptop computer through the same cable as the power. The transfer of battery status information may be facilitated by a power delivery (PD) controller in the external battery that communicates with a power delivery (PD) controller in the laptop computer. One cable type that can support the transfer of battery status information with power is a Universal Serial Bus (USB) Type-C cable. Battery status information may be transferred as packetized data in vendor-defined messaging (VDM) packets from the external battery to the laptop computer. A controller within the laptop computer may decode the packets and report the battery status information to components within the laptop computer.

The status information may be received by a processor executing an operating system or a third-party application and/or by a basic input/output system (BIOS). The status information may be displayed to a user through the operating system or the third-party application in a graphical user interface (GUI) on a display screen, through a textual or graphical user interface in a BIOS, or through physical indicator lights in the laptop. For example, an operating system may report the external battery charge status along with information regarding the internal battery in a dialog box. That dialog box may also include information regarding an internal battery. As another example, a third-party application may obtain battery status information through an application programming interface (API) and report the charge level along with detailed information regarding the external battery through a dialog box. As yet another example, a physical indicator light on the laptop computer may indicate the external battery charge level, similar to the lights 112, 114, 116, and 118 of FIG. 1.

The status information may also be compared to predefined rules and actions performed autonomously based on the status information meeting criteria in the predefined rules. For example, when the external battery charge level decreases to below 20% the user may be provided a warning through a system dialog box on the display screen or through a physical indicator on the laptop. As another example, when the external battery charge level decreases to below 10% and no other power source is available the laptop may be automatically shut down to prevent loss of data or damage laptop components. Other criteria may be used to determine shut down with low battery charge level. For example, if a low battery charge level is indicated and no user input is received for a certain period of time, such as thirty seconds, then the computer may be shut down.

Although laptop computers, USB Type-C cables, and other details are provided in the examples described herein, embodiments of the invention may be implemented on other information handling systems, other cables, and other types of external batteries. For example, although laptop computers are described, any information handling system may benefit from communication with an external battery described in embodiments of this disclosure. A tablet computer or smart phone may be configured in a similar manner to the embodiments of a laptop computer. Furthermore, any information handling system may be configured to communicate with an external battery according to the embodiments of this disclosure. Similarly, many cable configurations with one or more conductors may provide power delivery and status information over the same cable.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
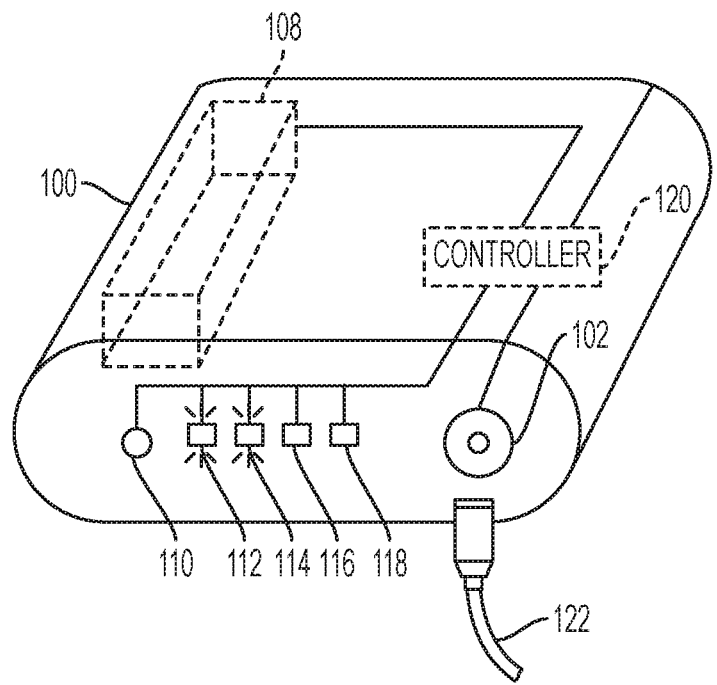
FIG. 1 is a perspective view of an external battery and operation elements therein according to the prior art.
Figure 2:
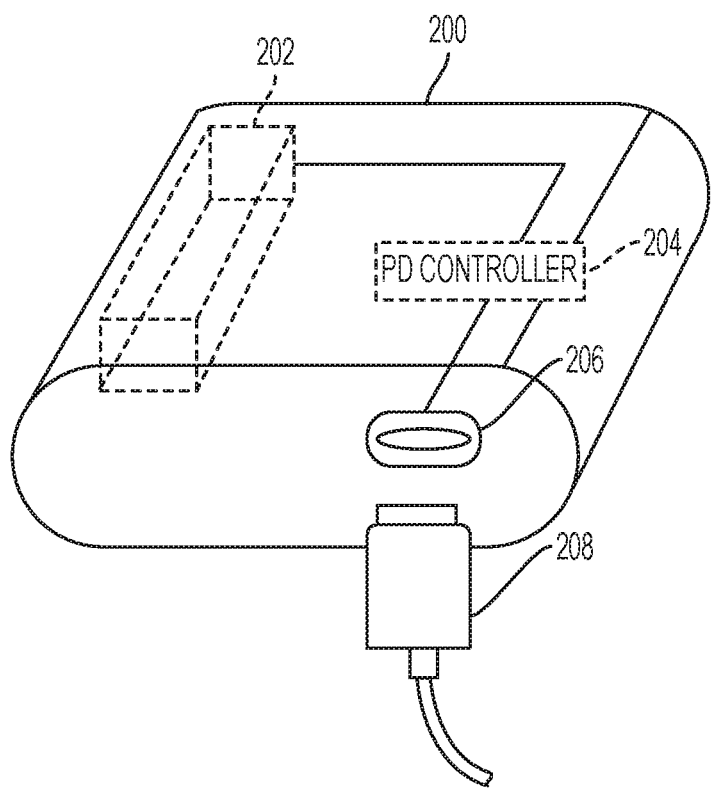
FIG. 2 is a perspective view of an external battery capable of communications with an external device according to some embodiments of the disclosure.

FIG. 2 is a perspective view of an external battery capable of communications with an external device according to some embodiments of the disclosure. An external battery 200 may include battery pack 202 including one or more battery cells. Battery cells may be coupled in series to obtain higher supply voltages or in parallel to obtain higher current output. A power delivery (PD) controller 204 may couple the battery pack 202 to a connector 206. A cable 208 may attach to the connector 206 to couple the external battery 200 to an information handling system, such as a laptop computer. The connector 206 may provide one or more conductors for transmitting supply power and/or information to a coupled system. For example, the connector 206 may be a Universal Serial Bus (USB) Type-C connector for coupling to a USB Type-C cable. A USB Type-C connector may include four power/ground pairs, two differential pairs for non-SuperSpeed data, four pairs for SuperSpeed data bus, two sideband use pins, a +5 V power for active cables, and/or a configuration pin used for cable orientation detection and dedicated biphase mark code (BMC) configuration data channel. The power delivery (PD) controller 204 may receive information from the battery pack 202 and/or monitor an output of the battery pack 202. Information about the battery cells, either obtained by receipt or monitoring, may be transferred to the laptop computer through the connector 206. The information may be packaged as packets according to a vendor-defined messaging (VDM) packet and transferred over data pins of the connector 206. A vendor-defined messaging (VDM) packet allows custom data transfer with arbitrary packet sizes and definitions over the USB Type-C cable. The PD controller 204 of the external battery 200 and the PD controller 312 of the information handling system 300 may be similarly configured to communicate using the same vendor-defined messaging (VDM) packet format. The information, either as packets or other formatted data, may be transmitted at periodic intervals (e.g., every 100, 200, 500, 1000, or 5000 milliseconds), transmitted at the occurrence of certain events (e.g., battery level reaching 50%, 25%, 10%, 5%, or battery temperature exceeding a threshold), and/or transmitted in response to requests from the laptop computer. The information transmitted over VDM or other data packages may include a battery identifier, a battery state of health, a battery error code, a battery service time, a battery cell vendor, a battery cell voltage, a battery temperature, and a battery charge level, and/or other battery information.

Figure 3:
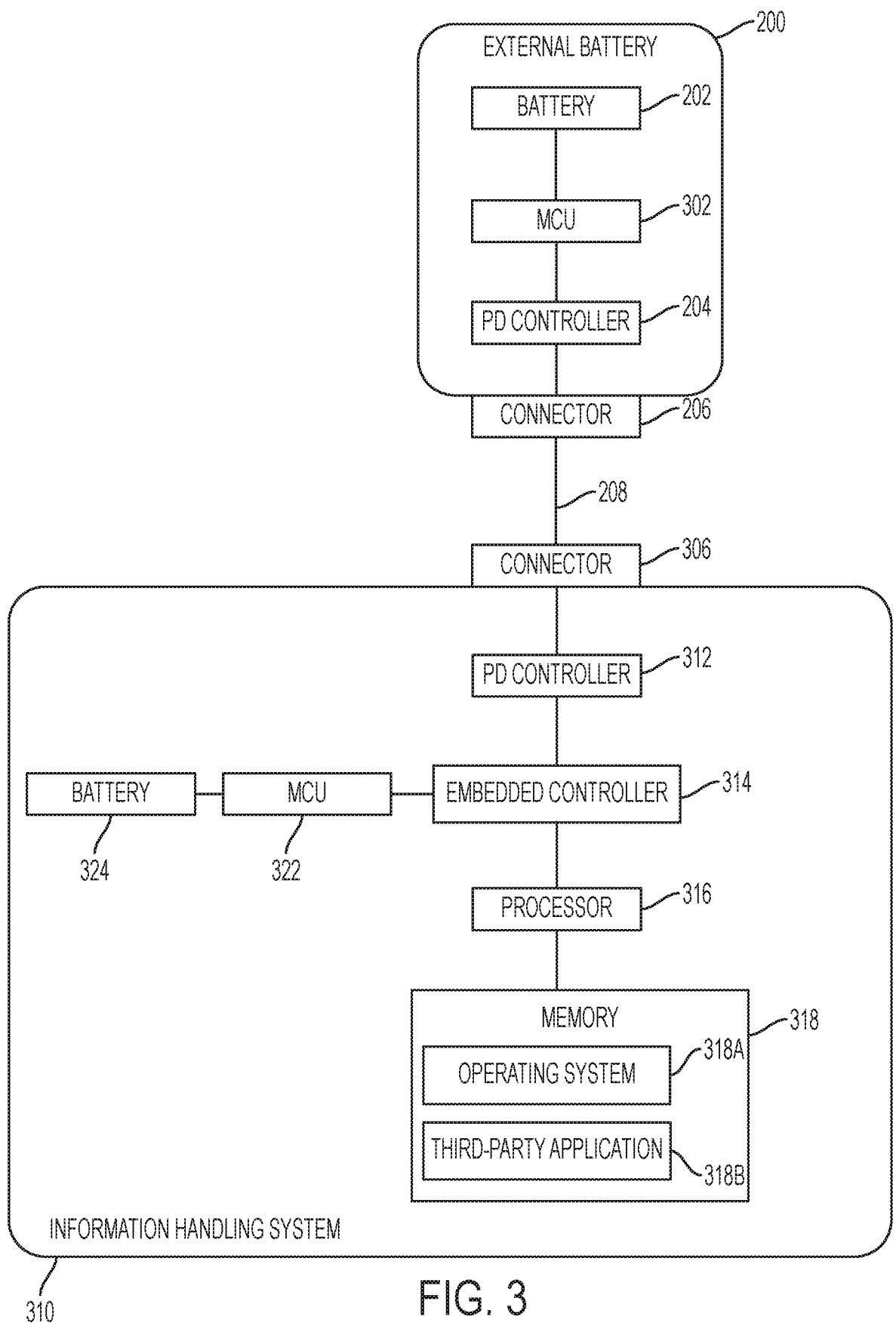
FIG. 3 is a block diagram illustrating an example information handling system coupled to an external battery with components for communicating with the external battery according to some embodiments of the disclosure.

The information regarding the external battery 200 may be processed within an information handling system and displayed to a user. FIG. 3 is a block diagram illustrating an example information handling system coupled to an external battery with components for communicating with the external battery according to some embodiments of the disclosure. The external battery 200 is illustrated coupled to the information handling system 310 through a cable 208 between the connectors 206 and 306. A power delivery (PD) controller 312 in the information handling system 312 may receive power and/or data from the cable 208. The power may be diverted to voltage regulation circuitry (not shown) to power the information handling system 310, including the components shown in FIG. 3. The data may be extracted and formatted for transfer to an embedded controller 314 over a bus such as an Inter-Integrated Circuit (I2C) bus. In some embodiments, the PD controller 312 may depacketize information in packets received through the cable 208 and reformat the data for transmission on an I2C bus to the embedded controller 314. The embedded controller 314 may perform processing on status information regarding the external battery 200. For example, the status information may be processed by comparing the information to predefined rules and actions taken in response to criteria of the predefined rules being met by the status information. As another example, the status information may be processed by formatting the information for transmission to a processor 316 over an Enhanced Serial Peripheral Interface (eSPI) or Low Pin Count (LPC) bus. The embedded controller 314 may also be coupled to a microcontroller (MCU) 322. The MCU 322 may be coupled to and configured to monitor a battery 324 internal to the information handling system 310. An embedded controller, such as the embedded controller 314, may be attached to a motherboard or other printed circuit board (PCB) embedded within the information handling system 310 and coupled to busses on the motherboard or PCB. Although an embedded controller 314 is described as performing battery monitoring in the information handling system, other forms of controllers may be used in the information handling system.

Figure 4:
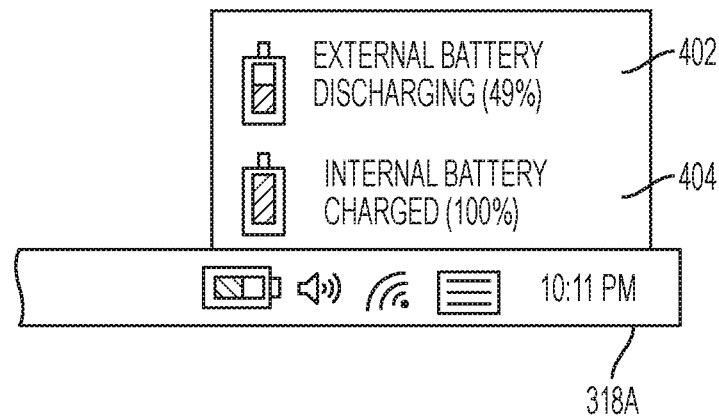
FIG. 4 is an example graphical user interface (GUI) illustrating display of external battery status to a user according to some embodiments of the disclosure.

The processor 316 may execute software stored in a memory 318 to display the information to a user or perform actions based on the information. An operating system 318A resident in the memory 318 and executed by the processor 316 may include algorithms for receiving, monitoring, and displaying battery information. FIG. 4 is an example graphical user interface (GUI) illustrating display of external battery status to a user according to some embodiments of the disclosure. The operating system 318A may display battery status information 402 and 404 through a taskbar icon. The information may be accessed from the processor 316 through the Windows Messaging Interface (WMI) of the operating system 318A. The external battery information received through the cable 208 may be combined with internal battery information in such a display. For example, a battery status 402 for an external battery and a battery status 404 for an internal battery may be displayed, in which the displayed information may include a status (e.g., disconnected, empty, discharging, charging, full) and a charge level (e.g., 0-100%). Additional interfaces in the operating system 318A may allow a user to define rules based on charge levels or other status information and actions to be performed when the rules are met. These defined rules may be stored in memory 318 and compared to battery information by the processor 116. The processor 116 may perform actions, such as causing the information handling system 310 to enter a suspended mode or to shut down in response to low battery charge levels. In some embodiments, the operating system 318A may program the embedded controller 314 with the defined rules such that the embedded controller 314 can execute the rules based on battery status information received from the PD controller 312.

Figure 5:
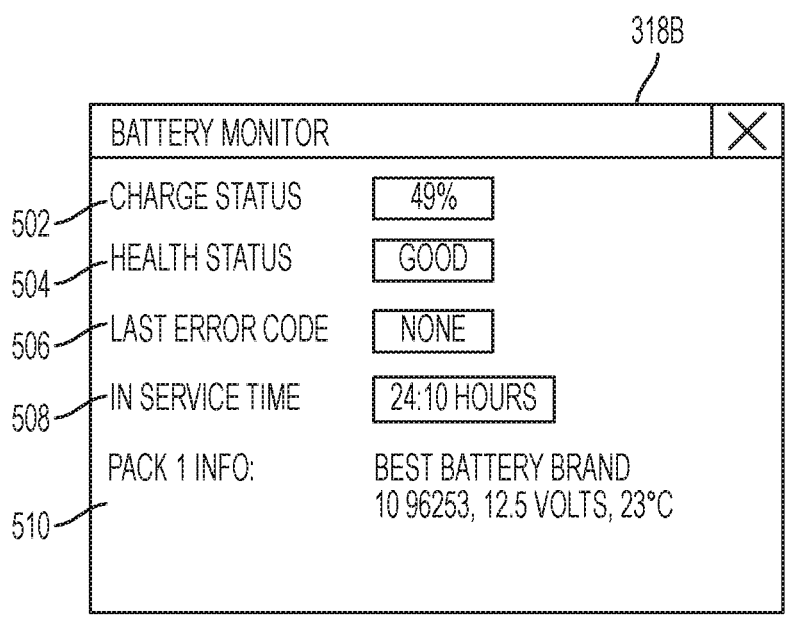
FIG. 5 is an example graphical user interface (GUI) illustrating display of detailed information regarding an external battery to a user according to some embodiments of the disclosure.

Returning to FIG. 3, a third-party application 318B resident in memory 318 and executed by the processor 316 may include algorithms for receiving, monitoring, and displaying battery information. Examples of third-party applications include Dell Command Power Manager (DCPM) and Dell Quickset Utility. FIG. 5 is an example graphical user interface (GUI) illustrating display of detailed information regarding an external battery to a user according to some embodiments of the disclosure. The application 318B may display battery status information 502, 504, 506, 508, and 510. Displayed battery status information may include a charge status 502 (e.g., 0-100%), a health status 504 (e.g., good, bad, warning), a last error code 506, an in-service time 508 (e.g., number of minutes or hours the battery has been charging or discharging), and/or battery information 510 (e.g., brand, identifier, voltage, and/or temperature). Additional interfaces in the application 318B may allow a user to define rules based on charge levels or other status information and actions to be performed when the rules are met. These defined rules may be stored in memory 318 and compared to battery information by the processor 316. The processor 316 may perform actions in response to the received battery information in accordance with the rules. For example, the processor 316 may cause the information handling system 310 to enter a suspended mode or to shut down in response to low battery charge levels. In some embodiments, the application 318B may cause the processor 316 to program the embedded controller 314 with the defined rules such that the embedded controller 314 can execute the rules based on battery status information received from the PD controller 312.

Figure 6:
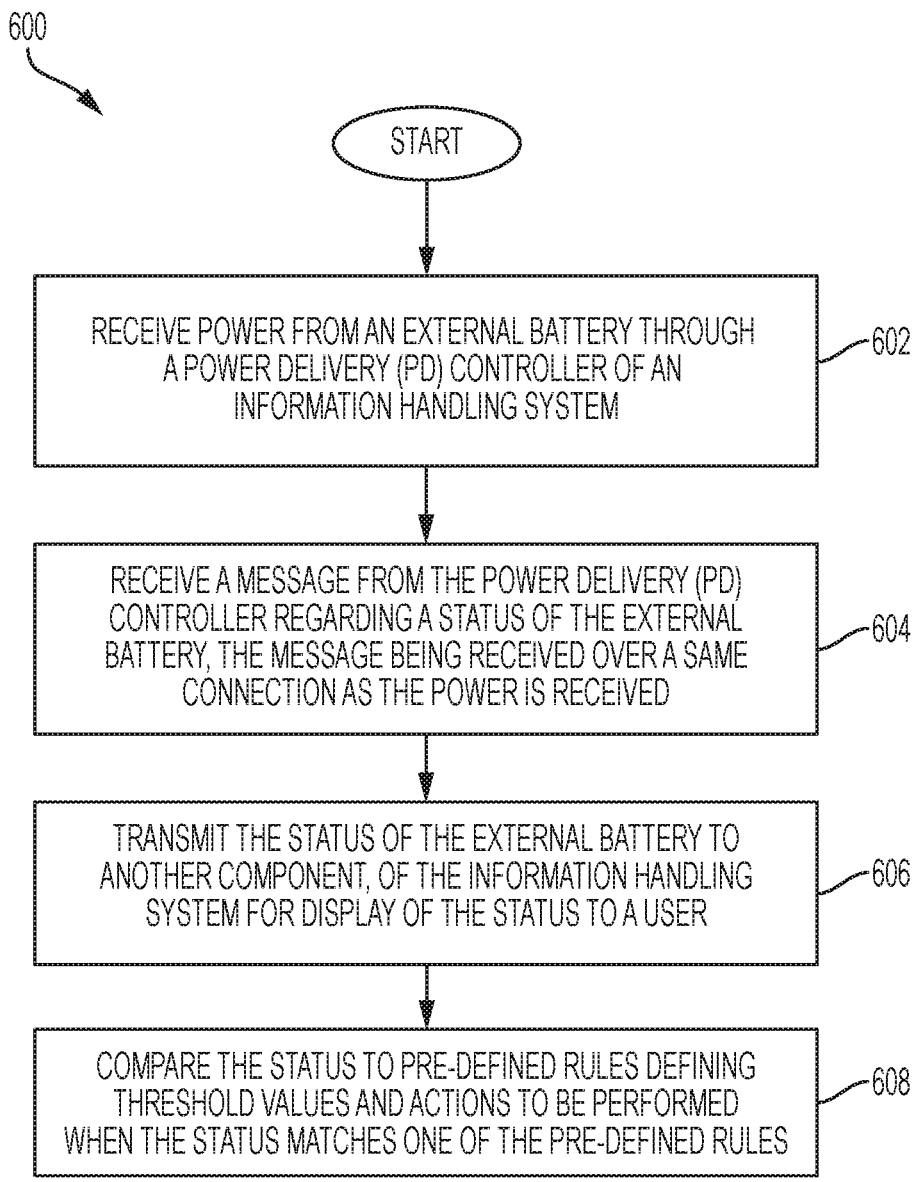
FIG. 6 is a flow chart illustrating an example method for receiving power and status information from an external battery at an information handling system according to some embodiments of the disclosure.

A method for operating the embedded controller 314 to interface with the external battery 200 is illustrated in FIG. 6. FIG. 6 is a flow chart illustrating an example method for receiving power and status information from an external battery at an information handling system according to some embodiments of the disclosure. A method 600 may include receiving, by an embedded controller at block 602, power from an external battery through a power delivery (PD) controller of an information handling system. For example, the embedded controller may be powered from the same external battery that the embedded controller will receive information at block 604. Some power delivery circuits may condition the voltage supply received from the external battery to condition the supply for operating the embedded controller. However, the embedded controller may also be powered from, for example, an internal battery for communicating with the external battery.

The embedded controller may receive and process information regarding the external battery along with other information. At block 604, the embedded controller may receive a message from the PD controller with status information for the external battery. The received message may be originally received by the PD controller over the same connection as the power is received from the external battery. At block 606, the embedded controller transmits the status of the external battery to another component of the information handling system for display of the status to a user. For example, the embedded controller may transmit information to a processor for display to a user through an operating system or third-party application as illustrated in FIG. 4 and FIG. 5. The information regarding the external battery may be communicated along with other information regarding the external battery, other batteries (such as an internal battery), or other system components. At block 608, the embedded controller may compare the status to predefined rules defining threshold values for certain aspects of the battery and defining actions to be performed when the status matches one or more of the pre-defined rules.

An embedded controller may perform other operations using the battery status information. For example, the embedded controller may operate physical indicator lights on the information handling system to convey battery status information to a user. A light emitting diode (LED) visible to a user may change color from green, to orange, to red, to blinking red under control of the embedded controller as the battery charge level decreases below 50%, 25%, 10%, and 7%, respectively. As another example, the embedded controller may transmit battery status information to a wired network interface (e.g., Ethernet) or a wireless network interface (e.g., WiFi or Bluetooth) for transmission to a remote user. As a further example, the embedded controller may provide the battery status information to a Basic Input/Output System (BIOS) or Unified Extensible Firmware Interface (UEFI) for displaying the battery status in a pre-boot screen.

The embedded controller may receive information regarding an internal battery status and combine the internal battery status with external battery status information for transmission to the processor or other component of the information handling system. A method for combining internal and external battery status information may include receiving, by the embedded controller, information regarding a status of the internal battery; combining, by the embedded controller, the information regarding the status of the internal battery with information regarding the status of the external battery extracted from the received message from the power delivery (PD) controller to form combined data; and transmitting, by the embedded controller, the combined data to a processor of the information handling system for display to a user.

The schematic flow chart diagram of FIG. 6 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although a controller is described throughout the detailed description, aspects of the invention may be implemented on different kinds of processors, such as graphics processing units (GPUs), central processing units (CPUs), and digital signal processors (DSPs), or application specific integrated circuits (ASICs). As another example, although processing of certain kinds of data may be described in example embodiments, other kinds or types of data may be communicated through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. An information handling system, comprising:
    a power delivery (PD) controller configured to couple to an external battery; and
    an embedded controller coupled to the power delivery (PD) controller, wherein the embedded controller is configured to perform steps comprising:
        receiving a message from the power delivery (PD) controller regarding a status of an external battery; and
        transmitting the status of the external battery to another component of the information handling system for display of the status to a user.

2. The information handling system of claim 1, wherein the embedded controller is further configured to perform steps comprising performing an action in response to the received message.

3. The information handling system of claim 2, wherein the action comprises shutting down the information handling system when the received message indicates a capacity of the external battery is below a threshold level.

4. The information handling system of claim 1, wherein the power delivery (PD) controller is configured to couple to the external battery through a universal serial bus (USB) Type-C connection.

5. The information handling system of claim 4, wherein the embedded controller is configured to decode vendor-defined messaging (VDM) packets received from the power delivery (PD) controller to obtain at least one of a battery identifier, a battery state of health, a battery error code, a battery service time, a battery cell vendor, a battery cell voltage, a battery temperature, and a battery charge level.

6. The information handling system of claim 1, wherein the embedded controller is configured to perform the step of transmitting the status to another component by transmitting the status to a processor of the information handling system for display to a user through an operating system.

7. The information handling system of claim 5, wherein the embedded controller is configured to communicate with the power delivery (PD) controller over an I2C communications bus, and wherein the embedded controller is configured to communicate with the processor over at least one of a low pin count (LPC) communications bus and an Enhanced Serial Peripheral Interface (eSPI) communication bus.

8. The information handling system of claim 1, further comprising:
    an internal battery internal to the information handling system,
    wherein the embedded controller is also coupled to the internal battery of the information handling system, and wherein the embedded controller is configured to perform steps comprising:
        receiving information regarding a status of the internal battery;
        combining the information regarding the status of the internal battery with information regarding the status of the external battery extracted from the received message from the power delivery (PD) controller to form combined data; and
        transmitting the combined data to a processor of the information handling system for display to a user.

9. The information handling system of claim 1, wherein the embedded controller is configured to perform the step of transmitting the status of the external battery to another component by transmitting the status of the external battery to a basic input/output system (BIOS) of the information handling system.

10. An apparatus, comprising:
    a controller configured to couple to a power delivery (PD) controller and configured to perform steps comprising:
        receiving a message from the power delivery (PD) controller regarding a status of an external battery; and
        transmitting the status of the external battery to another component of the information handling system for display of the status to a user.

11. The apparatus of claim 10, wherein the controller is configured to perform the step of transmitting the status of the external battery to another component by transmitting the status of the external battery to a basic input/output system (BIOS) of the information handling system.

12. The apparatus of claim 10, wherein the controller is configured to perform the step of transmitting the status of the external battery to a processor of the information handling system.

13. The apparatus of claim 10, wherein the controller is configured to decode vendor-defined messaging (VDM) packets received from the power delivery (PD) controller to obtain at least one of a battery identifier, a battery state of health, a battery error code, a battery service time, a battery cell vendor, a battery cell voltage, a battery temperature, and a battery charge level.

14. The apparatus of claim 10, wherein the controller is further configured to perform steps comprising performing an action in response to the received message.

15. The apparatus of claim 14, wherein the action comprises shutting down the information handling system when the received message indicates a capacity of the external battery is below a threshold level.

16. A method, comprising:
    receiving, by a controller, power from an external battery through a power delivery (PD) controller over a cable;
    receiving, by the controller, a message from the power delivery (PD) controller over the cable regarding a status of an external battery; and
    transmitting, by the controller, the status of the external battery to another component of the information handling system for display of the status to a user.

17. The method of claim 16, wherein the step of transmitting the status of the external battery to another component comprises transmitting the status of the external battery to a basic input/output system (BIOS) of the information handling system.

18. The method of claim 16, wherein the step of transmitting the status of the external battery to another component comprises transmitting the status of the external battery to a processor over at least one of a low pin count (LPC) communications bus and an Enhanced Serial Peripheral Interface (eSPI) communication bus.

19. The method of claim 16, further comprising the step of decoding, by the controller, vendor-defined messaging (VDM) packets received in the message from the power delivery (PD) controller to obtain at least one of a battery identifier, a battery state of health, a battery error code, a battery service time, a battery cell vendor, a battery cell voltage, a battery temperature, and a battery charge level.

20. The method of claim 16, further comprising the step of performing an action in response to the received message, wherein the action comprises shutting down an information handling system when the received message indicates a capacity of the external battery is below a threshold level.

* * * * *